(12) United States Patent
Wan et al.

(10) Patent No.: US 10,045,148 B2
(45) Date of Patent: Aug. 7, 2018

(54) LOCATION-BASED WIRELESS DEVICE PRESENTATION AND CONNECTION

(71) Applicant: Intel Corporation, Santa Clara, CA (US)

(72) Inventors: Chieh-Yih Wan, Beaverton, OR (US); Rita H. Wouhaybi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 243 days.

(21) Appl. No.: 14/752,567

(22) Filed: Jun. 26, 2015

(65) Prior Publication Data

US 2016/0381497 A1    Dec. 29, 2016

(51) Int. Cl.
*H04W 24/00* (2009.01)
*H04W 4/02* (2018.01)
*H04W 8/00* (2009.01)

(52) U.S. Cl.
CPC ............. *H04W 4/02* (2013.01); *H04W 8/005* (2013.01)

(58) Field of Classification Search
None
See application file for complete search history.

(56) References Cited

U.S. PATENT DOCUMENTS

| 9,642,183 | B2 * | 5/2017 | Montag ................ H04W 84/12 |
| 2011/0012743 | A1 | 1/2011 | Van Gorp et al. |
| 2012/0058733 | A1 * | 3/2012 | Jovicic .................. G01S 5/0027 455/67.11 |
| 2012/0309427 | A1 | 12/2012 | Harvey et al. |
| 2013/0226444 | A1 | 8/2013 | Johansson et al. |
| 2013/0229928 | A1 * | 9/2013 | Lipman ................. G01S 5/0215 370/252 |
| 2014/0094167 | A1 | 4/2014 | Thota |

(Continued)

FOREIGN PATENT DOCUMENTS

WO    WO2012/048442 A1    4/2012

OTHER PUBLICATIONS

International Search Report and Written Opinion dated Aug. 8, 2016 for International Application No. PCT/US2016/033075, 12 pages.

(Continued)

*Primary Examiner* — Shantell L Heiber
(74) *Attorney, Agent, or Firm* — Schwabe, Williamson & Wyatt, P.C.

(57) ABSTRACT

Apparatuses, methods, and computer-readable media for a proximity-based connection facilitation device ("PBC") may be described which may facilitate discovery and connection to computing devices. The PBC may present visual elements representing devices based on their locations, such as their proximity to the PBC. The PBC may present visual elements for a limited set of devices. The PBC may present computing devices in a visual manner that may depict their proximity to the PBC. The PBC may also provide for facilitated connection to devices that are not as proximate to the PBC. The PBC may facilitate identification of devices that are proximate to an identified device. By facilitating a user in selecting a first device and then visualizing devices proximate to the first device, the PBC may facilitate a user in chaining from a first device to devices that are less easily identified. Other embodiments may be described and/or claimed.

22 Claims, 9 Drawing Sheets

(56) References Cited

U.S. PATENT DOCUMENTS

| | | | |
|---|---|---|---|
| 2014/0179230 A1 | 6/2014 | Sydir et al. | |
| 2015/0080031 A1* | 3/2015 | Moldavsky | H04W 4/02 455/456.3 |
| 2015/0230055 A1* | 8/2015 | Smith | H04W 4/029 455/456.3 |
| 2015/0234832 A1* | 8/2015 | Gardner, III | G06F 17/3053 707/749 |
| 2015/0296473 A1* | 10/2015 | Chan | H04W 64/00 455/456.1 |
| 2015/0326704 A1* | 11/2015 | Ko | H04M 1/7253 455/456.3 |
| 2015/0358768 A1* | 12/2015 | Luna | H04W 4/02 455/456.1 |
| 2016/0007184 A1* | 1/2016 | Kulikov | G01S 5/0252 455/41.2 |

OTHER PUBLICATIONS

A. Carlotto et al.,"Proximity Classification for Mobile Devices Using Wi-Fi Environment Similarity", Jan. 2008, 19 pages, Massimo Valla—Telecom Italia Lab; http://www.researchgate.net/publication/220926556.

* cited by examiner

Location-based connection facilitation device

LOCATION-BASED WIRELESS DEVICE PRESENTATION AND CONNECTION

TECHNICAL FIELD

The present disclosure relates to the field of data processing, in particular, to apparatuses, methods and storage media associated with facilitating connections to wireless devices.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Computing devices continue to proliferate as there are greater and greater calls for computing power to be introduced into everyday devices and situations. Society continues to increase progress toward the "Internet of Things" ("IoT"), with its promise of ubiquitous computing availability in buildings, objects, spaces, etc. However, with the proliferation of IoT devices for home and business environments, managing and maintaining such devices threatens to become a daunting task. For example, oftentimes users may need to setup, register, or enroll new devices (e.g., smart light bulbs, smart thermostats, etc.) with an operating system or with one or more apps on personal mobile devices such as smartphones or tablets. In another example, a user might be connecting a new IoT device to a home WiFi network using a smartphone or a tablet. In another example, another user, such as another family member or friend, might need to access the same device either to control or share maintenance tasks. In both cases, oftentimes it is necessary for users' mobile devices to discover and identify the IoT device. While this discover and identification can be done through standard wireless discovery process such as WiFi scan or Bluetooth/BLE scan, doing a naïve scan in an IoT-rich environment could easily find tens or even hundreds of devices. This can turn an everyday task into a time-consuming ordeal.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

DETAILED DESCRIPTION

Figure 1:
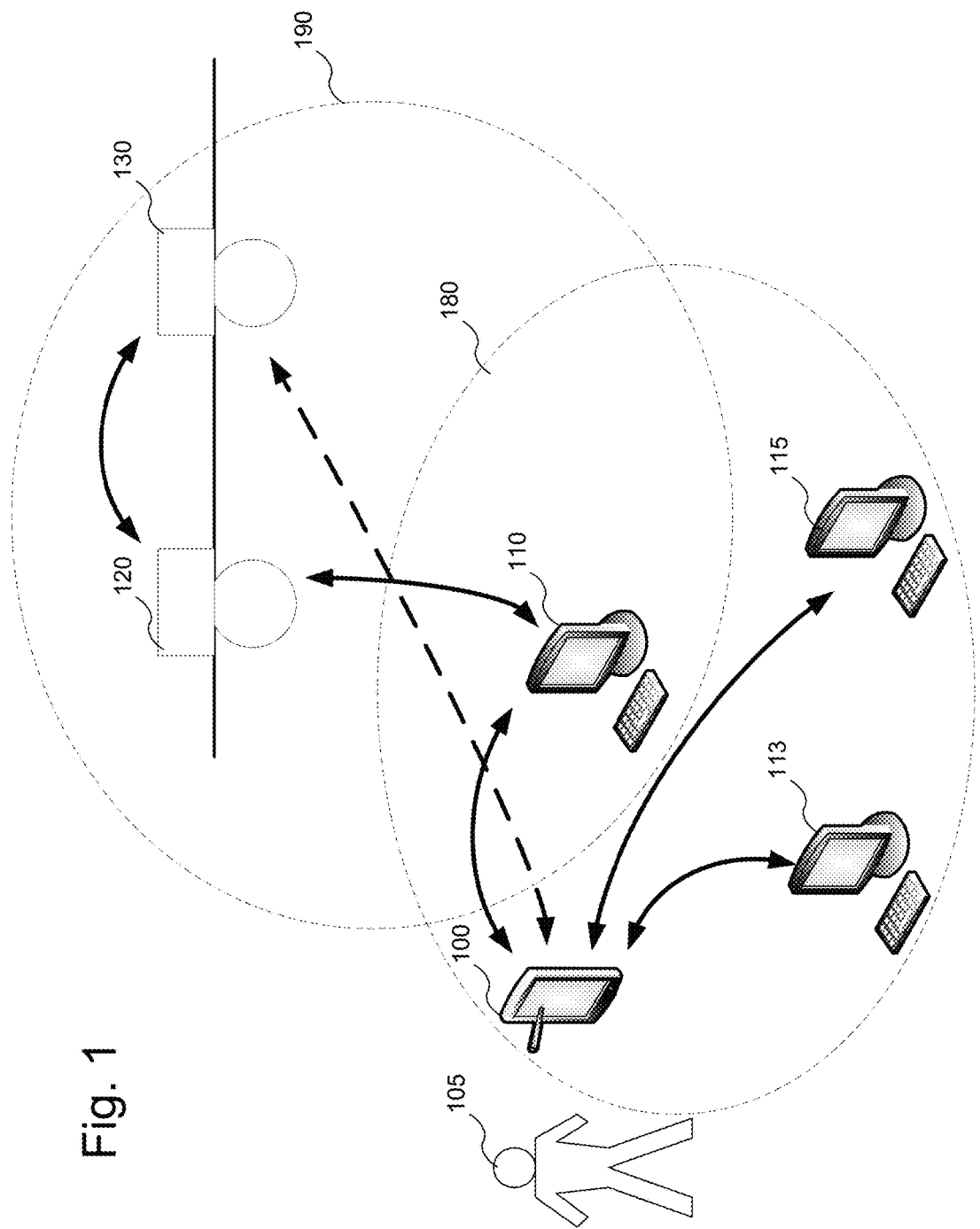
FIG. 1 illustrates a first example of location-based discovery of computing devices, in accordance with various embodiments.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. As described herein, the term "logic" and "module" may refer to, be part of, or include a System on a Chip, as described below.

In various embodiments, a proximity-based connection facilitation device ("PBC") may be configured to facilitate discovery and connection between the PBC, or, alternatively, another device, and one or more computing devices. In various embodiments, the PBC may be a specialized device to facilitate wireless connection to computing devices or may be a standard computing device, such as a personal computer, tablet, or mobile device, which is configured to perform the location-based connection techniques described herein. The connection which is facilitated by the PBC may be a wireless connection, such as over a Bluetooth™ or WiFi connection or via other wireless means.

In various embodiments, the PBC may be configured to facilitate the connection by presenting visual elements representing one or more computing devices, such as to a user, based on their locations. In various embodiments, the PBC may be configured to present visual elements for a limited set of computing devices such that the user does not have to select from a large number of available computing devices. For example, in various embodiments, the PBC may present one or more computing devices based on their proximity to the PBC itself. In such a proximity-based presentation, the PBC may present computing devices in a visual manner that may depict their proximity to the PBC itself, e.g. closer devices may be presented as closer in a visualization provided by the PBC to the user. This presentation may aid a user in identifying a computing device for connection. Additionally, the presentation may limited the number of computing devices which are represented, such as by only presenting devices within a particular range or limiting the number of visual elements, such that the user can more easily determine which are the most proximate computing devices and select from these.

For example, if a user physically places the PBC near to a computing device with which they wish to connect, the PBC may present that device as being most proximate to the PBC. The PBC may thus allow a user to easily identify and select the device for investigation and/or connection.

However, the PBC may also provide for facilitated connection to devices that are not necessarily proximate to the PBC. In various embodiments, the PBC may facilitate identification of one or more computing devices that are proximate to an identified computing device. For example, if a user selects a first computing device and requests to see other computing devices that are near to the first computing device, the PBC may present those other computing devices that are near to the first computing device; such presentation may include presentation of each other computing device's proximity to the selected first computing device. The user may also be presented with a limited number of visual elements in this scenario, such as by limiting the presentation to representing only those computing devices which are within a particular proximity to the selected first computing device. By facilitating a user in selecting a first computing device and then visualizing computing devices proximate to the first computing device, the PBC may facilitate a user in chaining from a potentially-known first computing device to computing devices that are less easily identified, while still providing a manageable number of computing devices for selection. Thus, the PBC may facilitate investigation and/or connection to computing devices that are not easily physically accessible by the user or their device.

Referring now to FIG. 1, an example of location-based connection to computing devices is illustrated in accordance with various embodiments. In the example of FIG. 1, a location-based connection facilitation device 100 ("PBC 100") may be used by a user 105 to discover and connect to one or more computing devices. In various embodiments, the PBC 100 may include various computing devices and/or environments, such as those described below with respect to FIGS. 8 and 9. However, it may be noted that, in various embodiments, the PBC 100 may include various forms and/or implementations, including, but not limited to, laptop computers, mobile devices such as mobile phones, tablets, etc. wearable devices such as computing-enabled glasses or watches, and Internet of Things ("IoT") devices, such as computing-enabled light bulbs, thermostats, televisions, refrigerators, microwave ovens, convectional ovens, wine refrigerators, etc. Additionally, while the term "computing devices" is used throughout to refer to devices and/or objects that have computing capabilities, no particular limitation should be inferred by this usage. Thus, in various embodiments, the "computing devices" referred to herein may include desktop or laptop computers, mobile devices, computing-capable sensors (e.g. thermometers, light sensors, etc.), computing-capable appliances (e.g., refrigerators), home automation equipment, vehicles, audio/visual equipment, etc.

In various embodiments, the PBC 100 may be configured to identify one or more computing devices that are proximate to the PBC 100. In particular, the PBC 100 may be configured to identify one or more computing devices that are proximate within a particular range. For example, in FIG. 1 the PBC 100 has wirelessly communicated with computing devices 110, 113, and 115, which are all within the range 180 of PBC 100, and may present information about each of these computing devices 110, 113, and 115 to the user 105 for selection. As illustrated, by presenting only computing devices which are within range 180, the PBC 100 may omit other computing devices, such as computing-capable light fixtures 120 and 130 (hereinafter, simply "light fixtures 120 and 130") light fixtures 120 and 130, which are further away. This presentation of limited information may facilitate the user 105 in selecting computing devices for discovery and connection, as relatively fewer choices may be made available.

In various embodiments, the PBC 100 may then allow the user 105 to investigate information about a selected computing device of computing devices 110, 113, and 115. The user 105 may then utilize the PBC 100 to obtain information about the selected computing device. Some of this information may be used for purposes of connection to the selected computing device, such as device name, device type, address information, supported connection protocols, communication keys, connection PINS, etc. In other embodiments, other information about the computing devices may be obtained, such as device type, device location information, computing and/or storage capabilities, etc. In various embodiments, the PBC 100 may be configured to establish a wireless communications connection to a selected computing device of the computing devices 110, 113, and 115, either for itself or on behalf of another computing device.

In various embodiments, the PBC 100 may be configured to utilize identified computing devices to further identify other computing devices for investigation and/or connection. For example, the PBC 100 in various embodiments, the PBC 100 may facilitate the user 105 in selecting a computing device to use as a landmark for discovery of other computing device. For example, in FIG. 1, the user 105 may select computing device 110 as a landmark and the PBC 100 may present computing devices based on their location relative to the computing device 110. Similar to the presentation discussed above, such presentation may be made of only those computing devices that are within a particular range of the landmark computing device. For example, the PBC 100 may thus present light fixture 120, which is proximate to the computing device 110 within range 190, but which is not necessarily as proximate to the user 105 (e.g., outside of range 180). Thus, in the example of FIG. 1, the user 105 may be presented with the light fixture 120 despite the light fixture 120 not being proximate to the light fixture 120. In various embodiments, the computing devices, such as light fixture 120, may share relative location information with each other, such as with computing device 110, so that computing devices may be used as landmarks. In various embodiments, the computing device 110 (and/or another computing device) may itself be configured to determine relative location information using strength and/or quality of wireless communication signals sent between the computing device 110 and other computing devices, such as light fixture 120. In other embodiments the, one or more computing devices may be configured to receive and maintain semantic labels which may indicate location information. For example, devices which are in a hardware lab, in a business setting, or a kitchen, in a home setting, may receive, "Hardware Lab" or "Kitchen" labels, such as from a user. Computing devices may then determine the closest computing devices with particular labels.

This use of a landmark may be useful to the user 105, as they may not be able to physically approach the light fixture 120. In another example, the user 105 may not be able to approach the light fixture 120 to a distance where they can uniquely identify which computing device presented by the PBC 100 is the light fixture 120, such as if they are equidistant to two computing-enabled light fixtures. Thus, by using the computing device 110 as a landmark, the user 105 may be aided in identifying the light fixture 120 when presented with computing devices that are proximate to the computing device 110. In a similar fashion the user 105 may then use the identified light fixture 120 as a landmark itself, and may identify computing devices that are proximate to the light fixture 120, such as light fixture 130. The user 105 may thus chain together identification of computing devices with use of those computing devices as landmarks to identify, investigate, and connect to computing devices that would be impossible to approach or otherwise difficult to identify and connect to.

Figure 2:
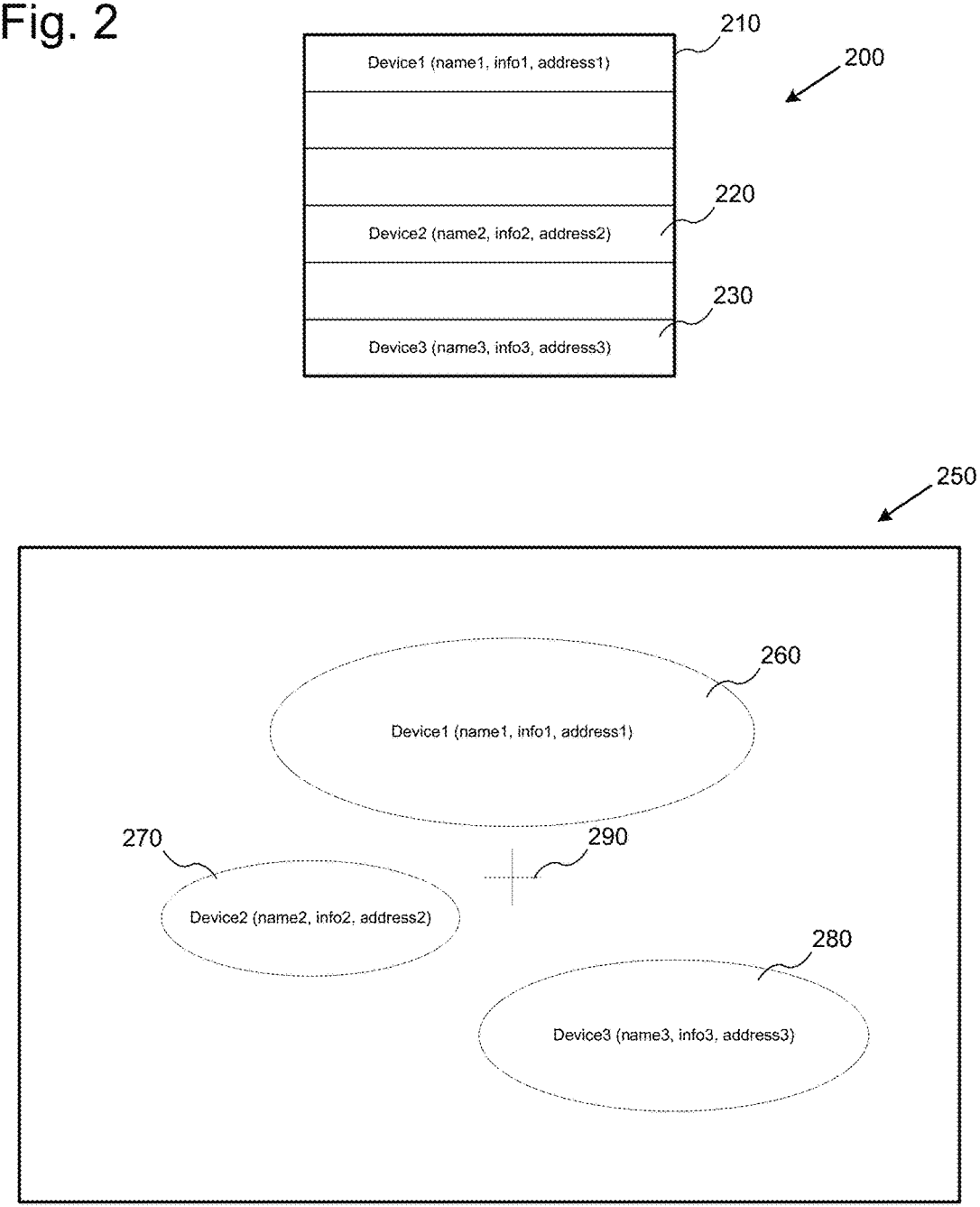
FIG. 2 illustrates examples of location-based presentation of computing devices, in accordance with various embodiments.

Referring now to FIG. 2, examples of location-based presentation of computing devices is illustrated in accordance with various embodiments. FIG. 2 illustrates two example location-based presentations 200 and 250 of computing devices. However, it may be recognized that, in various embodiments, the PBC 100 may be configured to provide other types of presentations. In various embodiments, a presentation provided by the PBC 100 may include one or more visual elements representing computing devices. In various embodiments, these visual elements may represent location of the computing devices. In various embodiments, the visual elements presented may represent fewer than all computing devices to which the PBC 100 may be able to discover and/or connect. In various embodiments the PBC 100 may be configured to present the visual elements to show the locations of the computing devices relative to the PBC 100 itself; in other embodiments, the PBC 100 may be configured to present the visual elements to show the locations relative to a different entity, such as, but not limited to, another computing device, a space in which the computing devices are located, a person, etc. In various embodiments, the PBC 100 may be configured to include in the visual elements information about the computing devices represented. For example, in FIG. 2, each example visual element illustrates a name and address for the represented computing device, along with other information, such as described above. In various embodiments, various combinations of information may be included in visual elements and/or different visual elements associated with different computing devices may include different types or amounts of information.

In the first example presentation 200, visual elements 210, 220, and 230, representing computing devices "device1", "device2", and "device3", are presented as a list. In various embodiments, when presenting these visual elements in a list form, the PBC 100 may be configured to list the computing devices in order of proximity to the PBC 100. In this way, the user 105 may be able to easily view which of the computing devices are closest, and easily select them based on their proximity. Thus, in the example presentation 200, computing device "device1" who's associated visual element 210 is at the top of the list, is closest to PBC 100, followed by computing devices "device2" and "device3", which are farther away, respectively. In various embodiments, the PBC 100 may also be configured to present visual elements in the list with space provided in between such that their associated computing devices' relative proximity may be visible. For example, in presentation 200, the computing device "device1" may be quite proximate to the PBC 100, while the computing devices "device2" and "device3" may be farther away, yet relatively close together. Thus, there is more space after visual element 210 and less space between visual elements 220 and 230.

In example presentation 250, visual elements 260, 270, and 280, representing the same computing devices "device1", "device2", and "device3", are presented in a two-dimensional presentation space. In various embodiments, the visual elements 260, 270, and 280, may be presented to show locations for the computing devices "device1", "device2", and "device3" relative to the location of the PBC 100, which may be represented by a crosshairs 290. Alternatively, or in addition to such relative placement, the visual elements 260, 270, and 280 may also be presented with differing sizes in order to illustrate proximity of their respective associated computing devices. In still other presentations, the visual elements may be presented in the presentation 250 such that the presentation 250 represents a space (such as a room) and the visual elements are shown based on their absolute positions in the space. As discussed herein, in various embodiments, other presentation techniques may be utilized.

Figure 3:
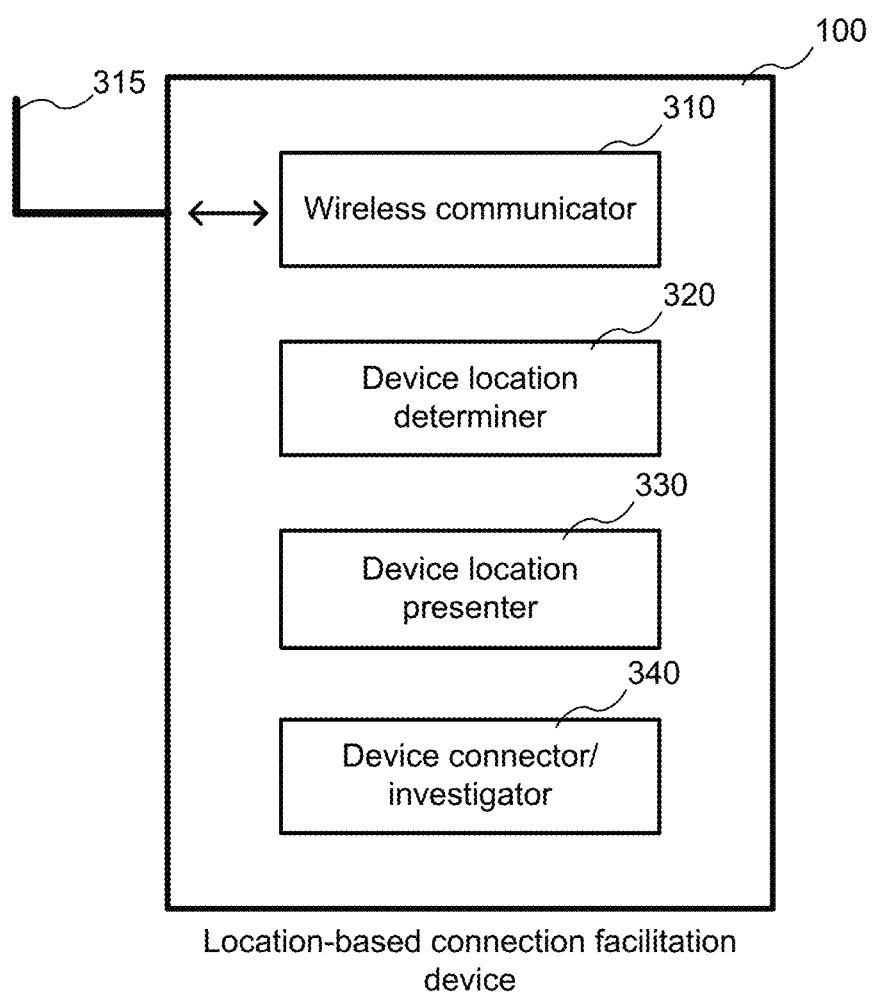
FIG. 3 illustrates examples of a location-based connection facilitation device, in accordance with various embodiments.

Referring now to FIG. 3, examples of an PBC 100 are illustrated in accordance with various embodiments. It may be noted that, while particular modules or components are illustrated as being part of the PBC 100, in various embodiments components and/or modules may be merged, split into additional entities, and/or omitted entirely. In various embodiments, and as mentioned herein, the PBC 100 may include various form factors, as may be understood, including laptop or desktop computers, mobile devices, phones, tablets, wearable devices, etc.

In various embodiments, the PBC 100 may include a wireless communicator 310 ("WC 310") which may be configured to transmit and/or receive various types of data which may be utilized by the PBC 100 to perform location-based connection facilitation as described herein. In various embodiments, the WC 310 may be configured to communicate with one or more computing devices, to facilitate connection with these devices, or to identify and facilitate connections with other wireless devices. For example, the WC 310 may be configured to receive device identifying information, such as device names or addresses, device type information, device location information, etc. In various embodiments, the WC 310 may be configured to communicate via a variety of communication methods or protocols, including Bluetooth and WiFi. In various embodiments, the WC 310 may be coupled to an antenna 315 to facilitate such communications.

In various embodiments, the WC 310 may be configured to provide information regarding connections to computing devices. For example, the WC 310 may be configured to measure relative signal strength ("RSS") received by the WC 310 and one or more computing devices. In various embodiments, this RSS may allow the PBC 100 to determine relative or absolute proximity of one or more computing devices to the PBC 100. In other embodiments, the WC 310 may be configured to determine other information about connection integrity and/or quality, such as interference, dropped packets, etc. This information may also be utilized to determine relative or absolute proximity of one or more computing devices to the PBC 100. Additionally, in various embodiments, the WC 310 may include one or more directional receivers and or transmitters, including, but not limited to, line-of-sight receivers and/or transmitters such as infrared receivers and/or transmitters. In various embodiments these receivers and/or transmitters may be utilized to provide additional information about locations or proximity of one or more computing devices.

In various embodiments the PBC 100 may also include a device location determiner 320 ("DL 320"). In various embodiments, the DL 320 may be configured to receive information about wireless communications from the WC 310 and to determine relative and/or absolute location information for one or more computing devices. In various embodiments, the DL 320 may be configured to receive explicit location information from one or more computing devices, such as through communications received using the WC 310. Such explicit location information may include, for a given computing device, identities of one or more computing devices which are proximate to the given computing device. In some embodiments, the explicit location information may include information describing absolute locations of computing devices and/or relative proximities of the computing devices to a given computing device. For example, the DL 320 may be configured to receive information of types such as "in the living room", "above this device", "within 6 inches from this device", "more than 10 feet away from this device", "6 inches east of this device", or "20 feet from this device". Additionally, in various embodiments, the DL 320 may be configured to receive absolute location information such as latitude/longitude coordinates such as from a Global Positioning System device ("GPS") or apparatus.

In various embodiments, the DL 320 may be thus configured to determine locations for computing devices that are not in active or current communication with the PBC 100, such as if the DL 320 receives location information describing locations of computing devices relative to a computing device that the PBC 100 is currently communicating with. In various embodiments, the DL 320 may be configured to filter computing devices, such as based on name, type, proximity, etc. In various embodiments, the DL 320 may also be configured to limit determination of locations for computing devices to those that are within a particular range, either of the PBC 100 itself, or of a selected landmark device.

In various embodiments, the PBC 100 may include a device location presenter 330 ("DP 330") which may be configured to present visual elements representing one or more computing devices for which the PBC 100 may facilitate investigation and/or connection. In various embodiments, the DP 330 may be configured to present these visual elements on a screen or projection associated with the PBC 100, such as, for example, tablet screen, watch screen, or glasses projection. In various embodiments, the DP 330 may be configured to present the visual elements based on location information determined by the DL 320. Particular non-limiting examples of presentations are provided above; however, in other embodiments the DP 330 may be configured to present the visual elements in alternative manners. In various embodiments, the PBC 100 may also include a device connector/investigator 340 ("DC 340"). In various embodiments, the DC 340 may be configured to facilitate investigation of information about one or more computing devices, such as by allowing a user 105 to select a visual element representing a computing device and request information for the computing device. The DC 340 may then be configured to provide information about the computing device, such as the computing device information discussed above. In various embodiments, the DC 340 may also be configured to facilitate connection to one or more of the computing devices, such as by receiving a selection of a computing device by the user 105 and then allowing the user 105 to initiate a pairing or mating process between the PBC 100 (or another device) and the selected computing device. In various embodiments, the particular connections that may be facilitated between the PBC 100 and a selected computing device may be understood to those of ordinary skill.

Figure 4:
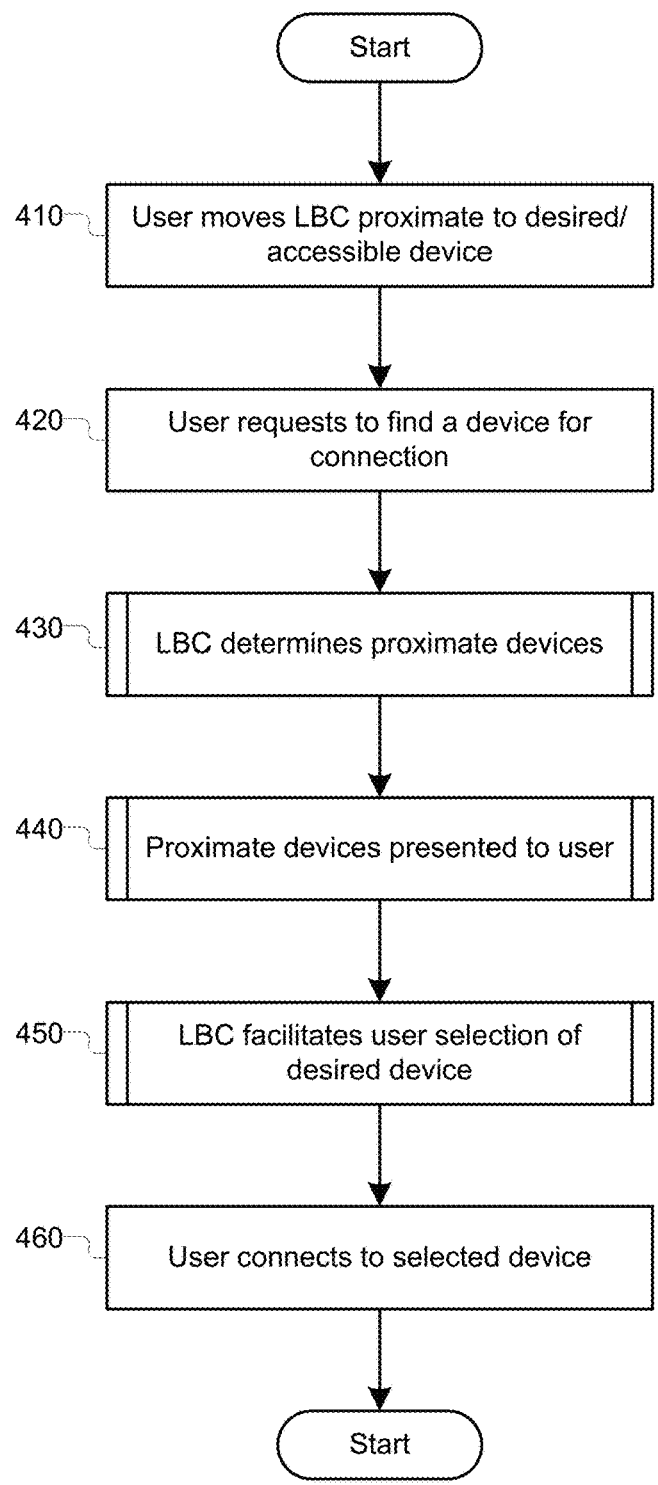
FIG. 4 illustrates an example process for location-based device connection facilitation, in accordance with various embodiments.

Referring now to FIG. 4, an example process 400 for location-based device connection facilitation is illustrated in accordance with various embodiments. While FIG. 4 illustrates particular operations in a particular order, in various embodiments the operations may be combined, split into parts, and/or omitted. The process may begin at operation 410, wherein the user 105 may move the PBC 100 proximate to a desired or accessible computing device. In various embodiments, the PBC 100 may be a mobile device, as discussed earlier, and may therefore be capable of being physically moved close to computing devices. In various embodiments, the user 105 may move the PBC 100 close to a computing device for which the user 105 desires to connect; in other embodiments, the user 105 may move the PBC 100 close to a computing device that the user may not wish to make a connection, but which is physically accessible and/or identifiable, such that the user 105 may use the computing device as a landmark for connection to other computing devices. After moving the PBC 100, at operation 420, the user 105 may request to find devices to make a connection. In various embodiments, the PBC 100 may be configured with one or more user interface elements that, upon selection, cause the PBC 100 to perform location-based investigation and connection as described herein.

Next, at operation 430, the PBC may determine one or more computing devices which are proximate to the PBC 100 or one or more of the proximate computing devices, and exclude computing devices beyond a proximity threshold to the PBC or one or more of the proximate computing devices. Particular embodiments of the process of operation 430 may be described below with reference to process 500 of FIG. 5. Then, at operation 440, the PBC 100 may present proximate computing devices to the user 105. Particular embodiments of the process of operation 440 may be described below with reference to process 600 of FIG. 6. Next, at operation 450, the PBC 100 may facilitate the user 105 in selecting a desire device for investigation and/or connection. It may be noted that, in various embodiments, the computing device selected may not be the device to which the PBC 100 was originally moved to be proximate to, such as when a device is used as a landmark to connect to an other device. Particular embodiments of the process of operation 450 may be described below with reference to process 700 of FIG. 7.

Next, at operation 460, the user 105 uses the PBC 100, and in particular the DC 340, to investigate and/or connect to the selected computing device. In various embodiments, at operation 460, the user 105 may connect the PBC 100 to the selected computing device. In other embodiments, the user 105 may connect another device to the selected device, such as by obtaining information from the selected device and performing a separate connection process, or by using the PBC 100 as a proxy or pass-through for the device to be connected to the selected computing device. In various embodiments, the user 105 may utilize the PBC 100 to connect multiple devices to a selected computing device. In various embodiments, the user 105 may, by connecting multiple selected computing devices to the computing device, identify a group of devices that may be able to be used in concert for computing or communications purposes. For example, multiple devices may selected and connected to a single other computing device, and, through that association, may be connected to each other through the single other computing device. In such scenarios, the PBC 100 may thus be utilized to facilitate creation of computing networks or sub-networks, such as mesh networks or peer-to-peer networks. Thus, through the use of the PBC 100, the user 105 may be facilitated in creating mesh networks and/or peer-to-peer networks out of a larger set of computing devices. After completion of operation 460, the process may end.

Figure 5:
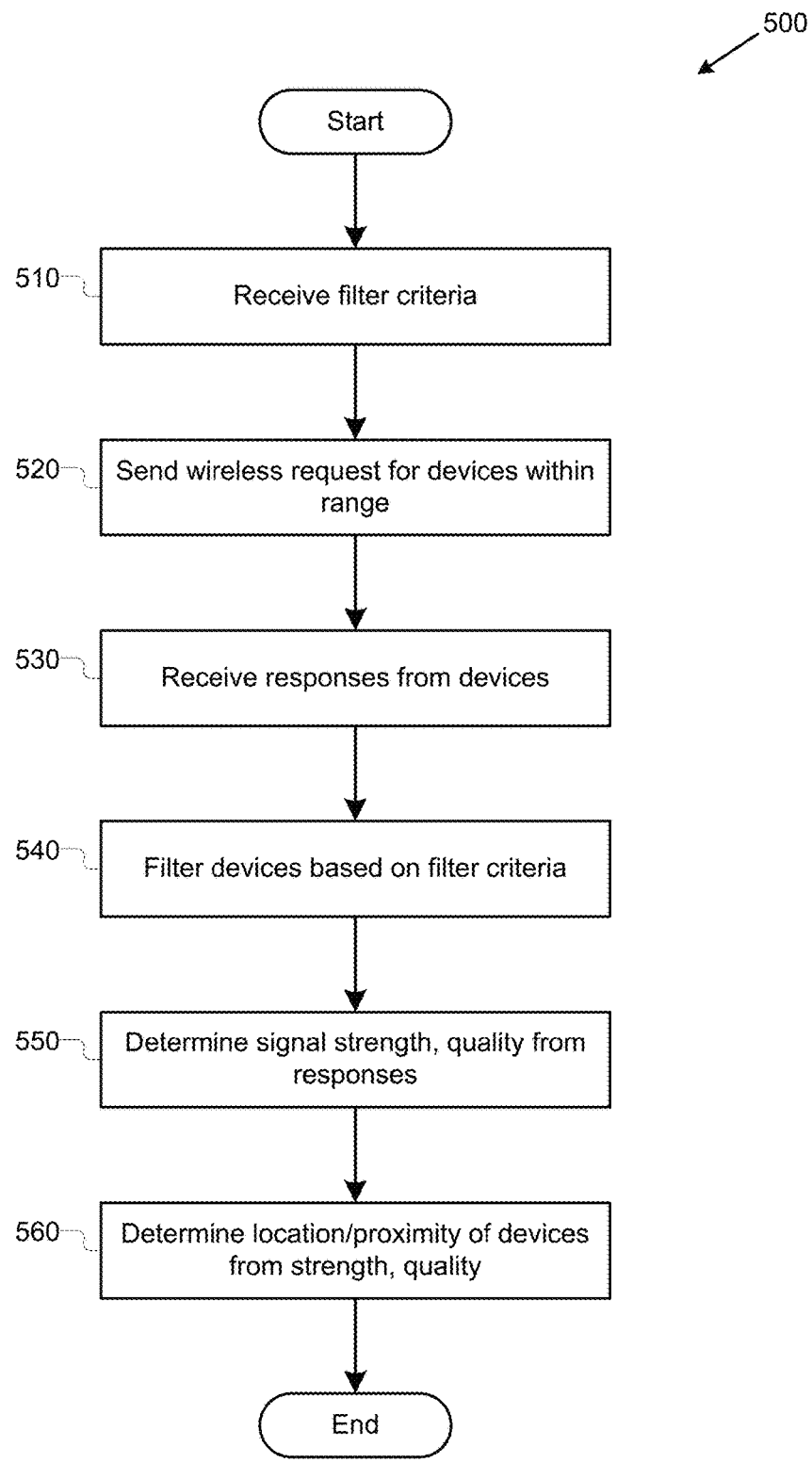
FIG. 5 illustrates an example process for determining proximate devices, in accordance with various embodiments.

Referring now to FIG. 5, an example process 500 for determining proximate devices is illustrated in accordance with various embodiments. In various embodiments, process 500 may be performed to implement, in whole or in part, operation 430 of process 400 of FIG. 4. While FIG. 5 illustrates particular operations in a particular order, in various embodiments the operations may be combined, split into parts, and/or omitted. The process may begin at operation 510, where the PBC 100, and in particular the DL 320, may receive filter criteria for one or more computing devices. In various embodiments, these filter criteria may be received from the user 105. In various embodiments, these filter criteria may be provided by the user 105 to filter which computing devices are represented when visual elements for the computing devices are presented to the user 105. In various embodiments, the filter criteria may include, but are not limited to, criteria such as device name, device type, communications protocols supported by the computing device, device location, etc. Next, at operation 520, the DL 320 may send a wireless request, such as through the WC 310, for devices. In various embodiments, the DL 320 and/or the WC 310 may send this request within a particular range, such as by limiting the amount of power used to send the request. In various embodiments, limiting the range of the request may facilitate the DL 320 in only receiving responses from computing devices that are within a known/accessible distance from the PBC 100. In various embodiments, limiting the range of the request may also facilitate the DL 320 in only receiving responses from a smaller group of computing devices, thus providing the user with a more manageable group to select from.

Figure 6:
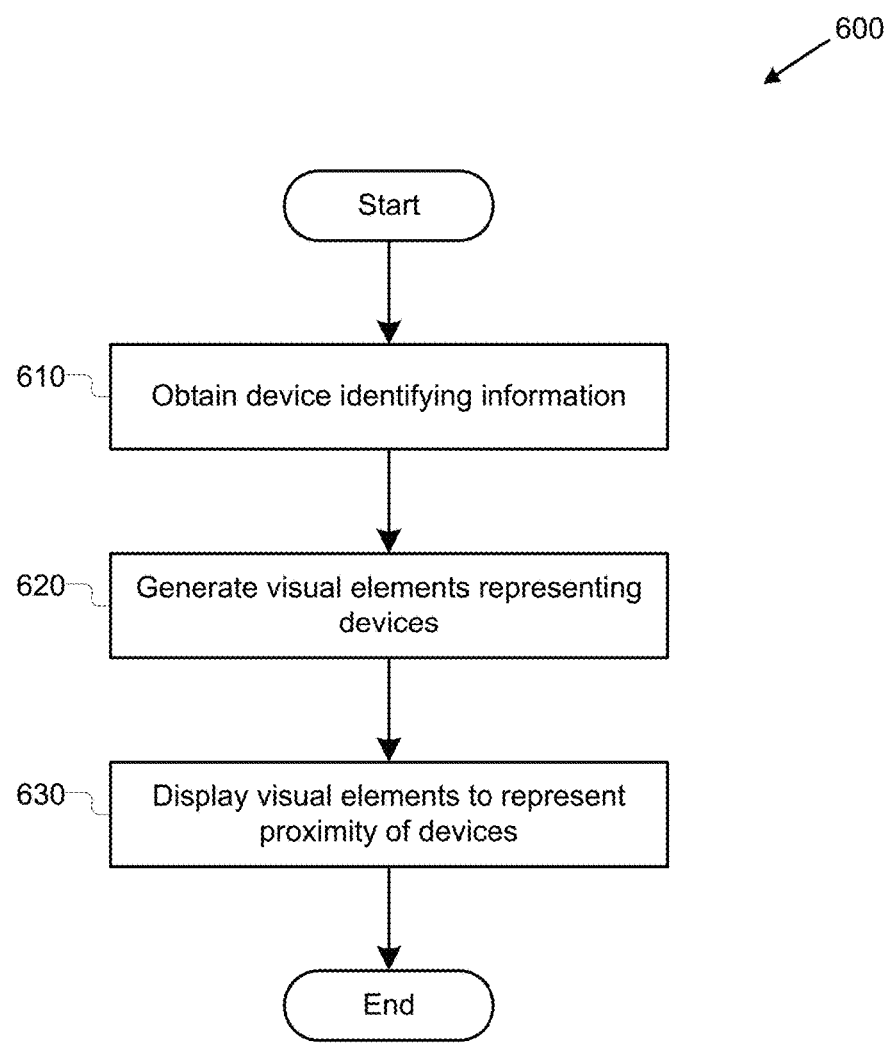
FIG. 6 illustrates an example process for presenting proximate devices to a user, in accordance with various embodiments.

Next, at operation 530, the DL 320 may receive responses from one or more computing devices. At operation 540, the DL 320 may filter these responses to those that match one or more of the filter criteria received at operation 510. Thus, if a response is received from a device for which no filter criteria are matched, the DL 320 may ignore the response and information about the computing device may not later be presented to the user 105. Next, at operation 550, the DL 320 may determine signal strength and/or quality metrics based at least in part on the responses received from the responding computing devices. As discussed above, such information may be received from the WC 310, which may be configured to provide such information based on its communications with the computing devices. At operation 560, the DL 320 may then determine locations and/or proximity of the one or more computing devices based on the received strength and quality metrics. In various embodiments, the DL 320 may determine the proximity and/or locations based on received strength and quality metrics utilizing known techniques. In various embodiments, proximity and/or location may be determined thorugh th training of proximity models via a machine learning techniques such as use of a Gaussian Mixture Model classifier to assess similarity between the WiFi environments as perceived by multiple computing devices. In such embodiments, the higher the similarity in two environments, the closer two devices may be inferred to be to each other. In other embodiments, wireless signal propagation model specific to a particular environment may be applied to infer distance from the received signal strength between multiple computing devices. The process may then end. Referring now to FIG. 6, an example process for presenting proximate devices to a user is illustrated in accordance with various embodiments. In various embodiments, process 600 may be performed to implement, in whole or in part, operation 440 of process 400 of FIG. 4. While FIG. 6 illustrates particular operations in a particular order, in various embodiments the operations may be combined, split into parts, and/or omitted. The process may begin at operation 610, where the DP 330 of the PBC 100 may obtain device-identifying information for the one or more computing devices which were filtered during process 500. In various embodiments, the obtained identifying information may include information such as device name, device type, device location, device operational status, etc. In various embodiments, the DP 330 may obtain identifying information for the one or more computing devices from the responses received by the DL 320 during the operation of process 500. In other embodiments, the DP 330 may obtain the identifying information by sending out one or more separate requests for information, such as via the WC 310. Next, at operation 620, the DP 330 may generate one or more visual elements representing the one or more computing devices. As illustrated above in the examples of FIG. 2, these visual elements may include list elements and/or ellipse-shaped (or other-shaped) elements; however in other embodiments, other visual elements may be generated at operation 620. In various embodiments, at operation 620 the DP 330 may generate the visual elements to include all or part of the identifying information obtained at operation 610. Next, at operation 630, the DP 330 may display the generated visual elements to represent the proximity of the one or more computing devices, such as determined by the DL 320. In various embodiments, the DP 330 may space list visual elements apart in a list to represent this proximity. In other embodiments, if ellipse (or other shape) visual elements are used, then at operation 630 the DP 330 may display the visual elements in a two-dimensional presentation to represent location and/or proximity of the represented computing devices. In other embodiments, the DP 330 may display one or more of the visual elements using different sizes to represent the relative proximities of the represented computing devices. After display of the visual elements, the process may then end.

Figure 7:
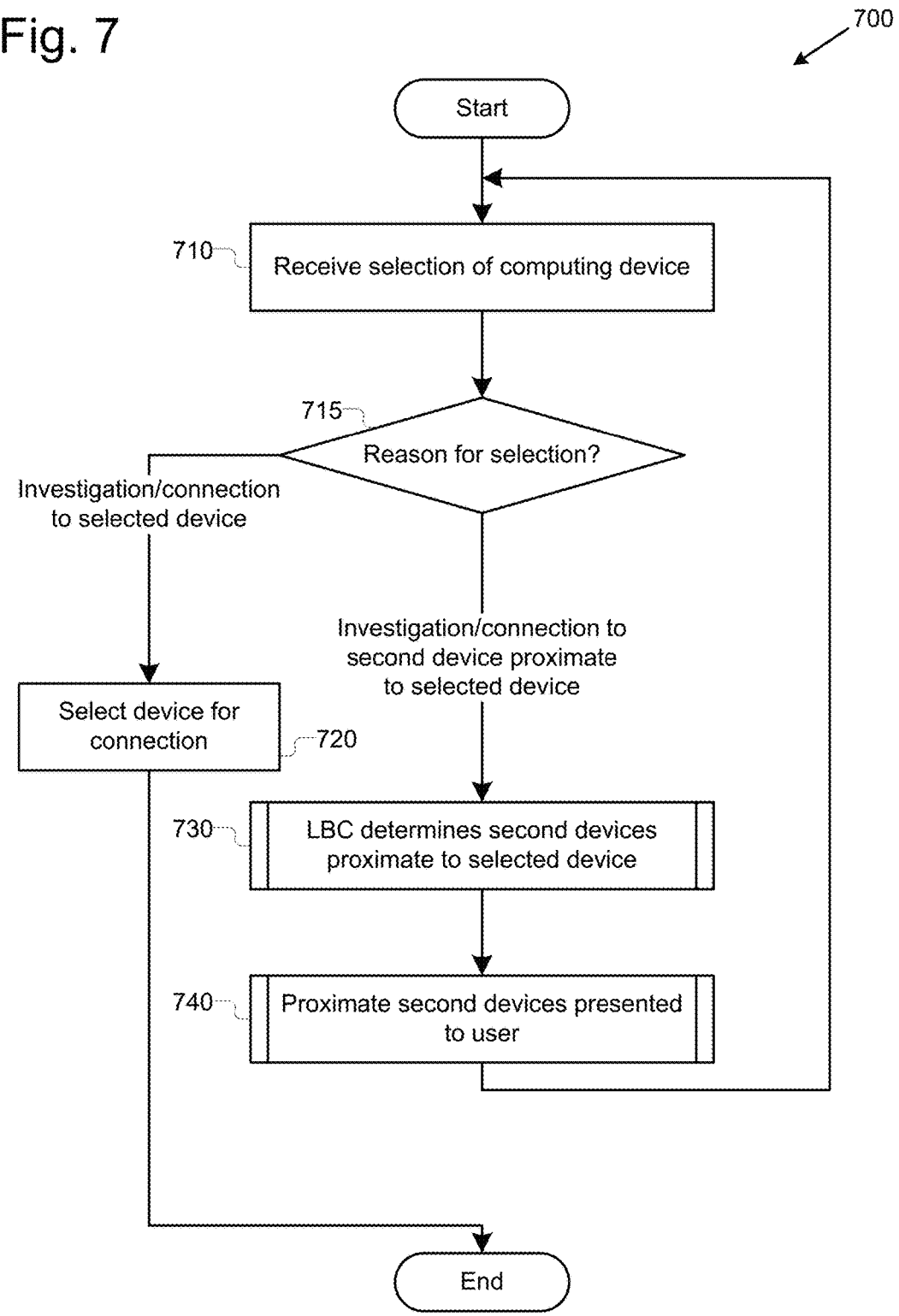
FIG. 7 illustrates an example process for facilitating user selection of a desired device, in accordance with various embodiments.

Referring now to FIG. 7, an example process 700 for facilitating user selection of a desired device is illustrated in accordance with various embodiments. In various embodiments, process 700 may be performed to implement, in whole or in part, operation 450 of process 400 of FIG. 4. While FIG. 7 illustrates particular operations in a particular order, in various embodiments the operations may be combined, split into parts, and/or omitted. The process may begin at operation 710, where the PBC 100 may receive, from the user 105, a selection of a presented computing device along with an action chosen for the computing device. Next, at decision operation 715, the PBC 100 may perform different actions depending on the chosen action. If the user 105 selects to investigate and/or connect to the selected device, then at operation 720, the device may be selected for investigation and/or connection. The process may then end (for connection or investigation to occur at operation 460 of process 400). If, however, the action is to connect to a second device proximate to the selected device, then at operation 730, the PBC 100, and in particular the DL 320, may determine one or more second computing devices which are proximate to the selected device. Because this operation may be similar to the operation where proximate devices were originally determined, particular embodiments of the process of operation 730 may be described above with reference to process 500 of FIG. 5. However, in various embodiments, the PBC 100 may be configured to receive relative location information from the selected device that describes locations of one or more proximate devices relative to the selected device, (e.g., "next to this device", "above this device", "two feet from this device," etc.). In various embodiments, the relative location information may be shared between computing devices through techniques such as periodic broadcasting or gossiping protocols among neighboring devices. In various embodiments, the relative location information may include semantic labels which may be attached to landmark devices to help making sense of the location info, e.g., "next to this kitchen device", "above this bathroom device", etc.

Next, at operation 740, the PBC 100, and in particular the DP 330, may present these second devices to the user 105. Because this operation may be similar to the operation where visual elements for proximate devices were originally presented, particular embodiments of the process of operation 740 may be described above with reference to process 600 of FIG. 6. In various embodiments, however, the second devices may be presented according to their proximity to the selected device, rather than the PBC 100. After presentation, the process may repeat to operation 810 for additional user 105 selection of a computing device.

Figure 8:
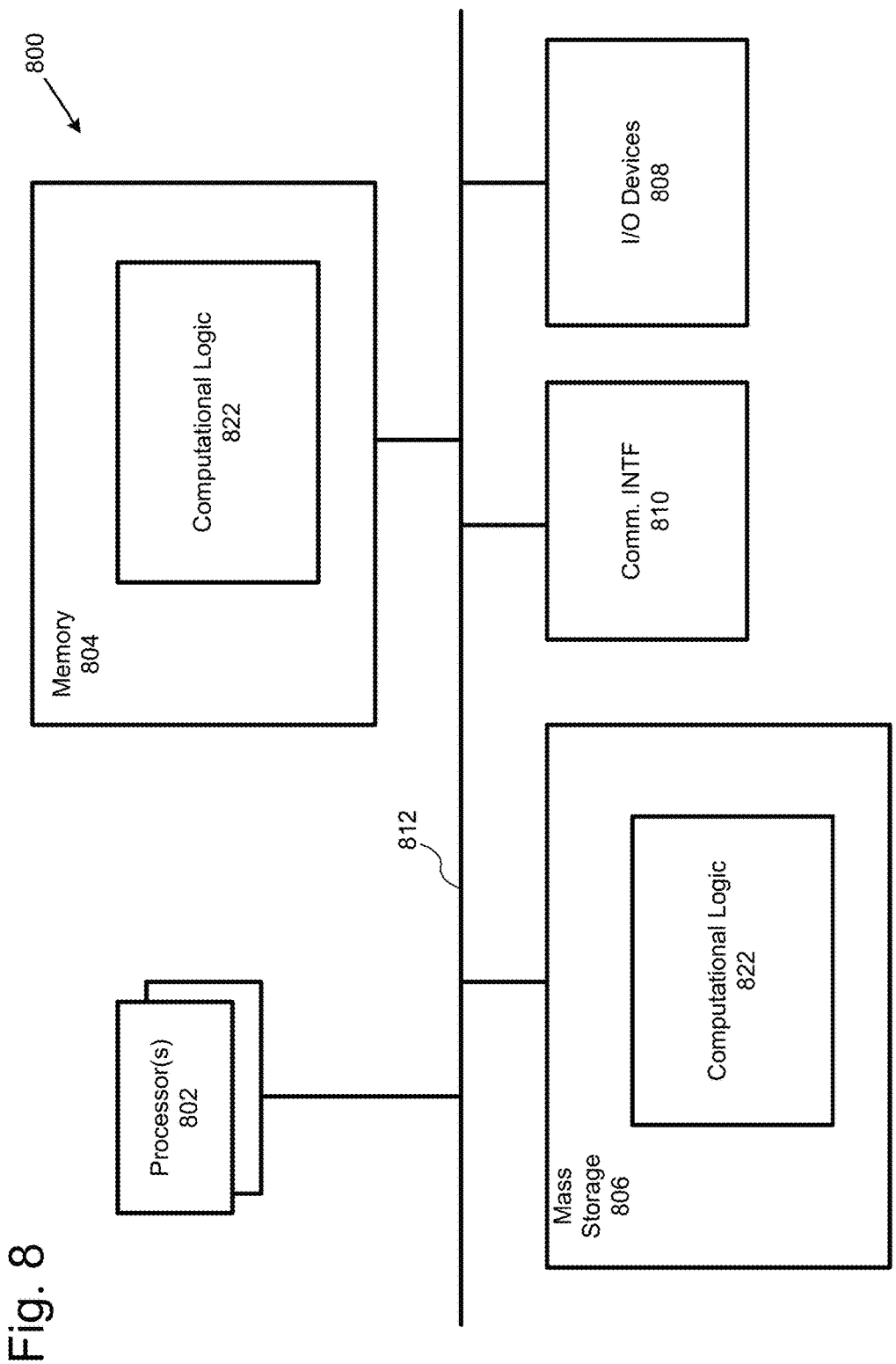
FIG. 8 illustrates an example computing environment suitable for practicing various aspects of the present disclosure in accordance with various embodiments.

Referring now to FIG. 8, an example computer suitable for practicing various aspects of the present disclosure, including processes of FIGS. 4-7, is illustrated in accordance with various embodiments. As shown, computer 800 may include one or more processors or processor cores 802, and system memory 804. For the purpose of this application, including the claims, the terms "processor" and "processor cores" may be considered synonymous, unless the context clearly requires otherwise. Additionally, computer 800 may include mass storage devices 806 (such as diskette, hard drive, compact disc read only memory (CD-ROM) and so forth), input/output devices 808 (such as display, keyboard, cursor control, remote control, gaming controller, image capture device, and so forth) and communication interfaces 810 (such as network interface cards, modems, infrared receivers, radio receivers (e.g., Bluetooth, Wi-Fi, Near Field Communications, Radio-frequency identification, and so forth). The elements may be coupled to each other via system bus 812, which may represent one or more buses. In the case of multiple buses, they may be bridged by one or more bus bridges (not shown).

Each of these elements may perform its conventional functions known in the art. In particular, system memory 804 and mass storage devices 806 may be employed to store a working copy and a permanent copy of the programming instructions implementing one or more of the modules shown in FIG. 3, and/or the operations associated with techniques shown in FIGS. 4-7, collectively referred to as computing logic 822. The various elements may be implemented by assembler instructions supported by processor(s) 802 or high-level languages, such as, for example, C, that can be compiled into such instructions. In various embodiments, the system memory 804 or mass storage 806 may include various memory implementations, including integrated flash memory, such as in a System on a Chip, a USB flash drive, SD Card, on SATA SSD, etc.

The permanent copy of the programming instructions may be placed into permanent storage devices 806 in the factory, or in the field, through, for example, a distribution medium (not shown), such as a compact disc (CD), or through communication interface 810 (from a distribution server (not shown)). In embodiments, the programming instructions may be stored in one or more computer readable non-transitory storage media. In other embodiments, the programming instructions may be encoded in transitory storage media, such as signals.

The number, capability and/or capacity of these elements 810-812 may vary. Their constitutions are otherwise known, and accordingly will not be further described.

Figure 9:
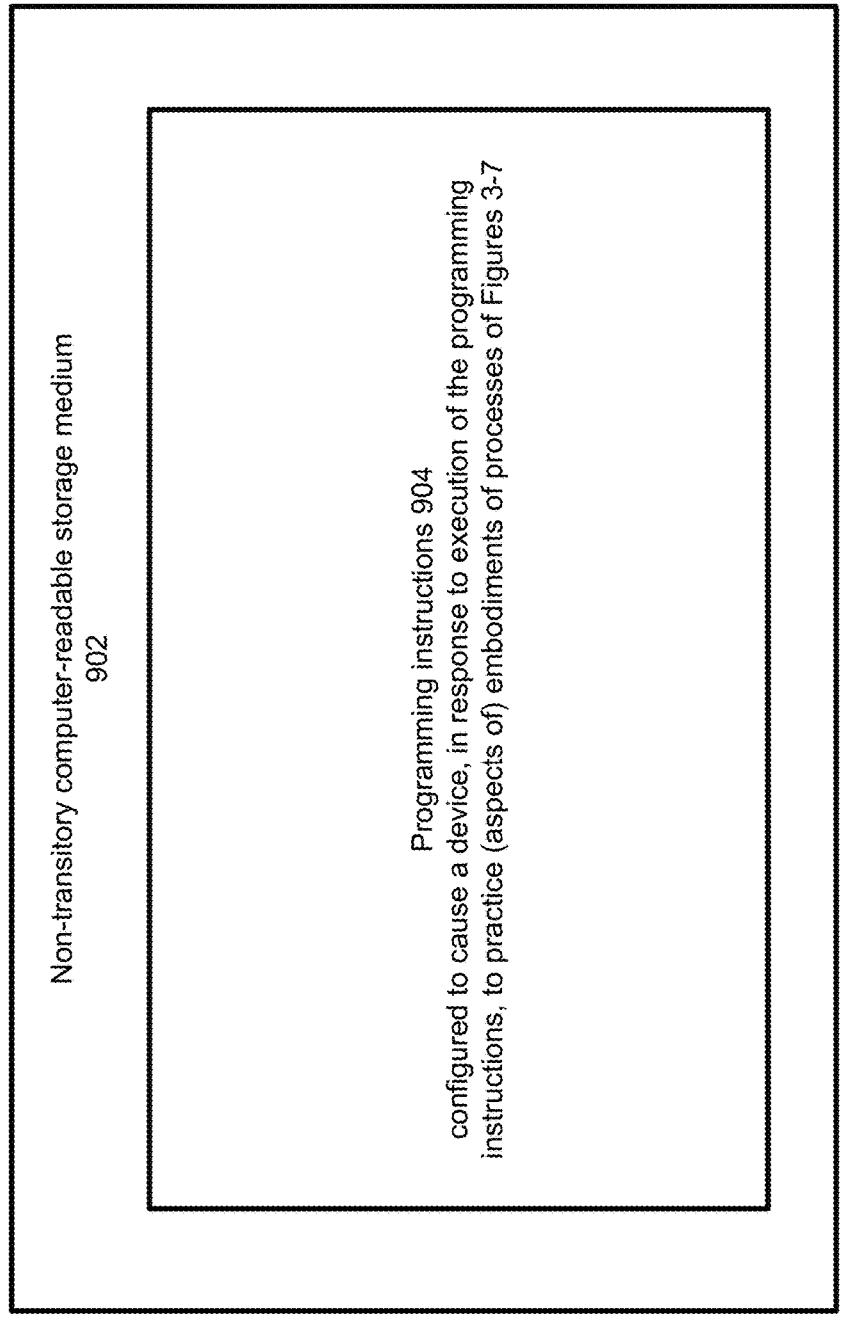
FIG. 9 illustrates an example storage medium with instructions configured to enable an apparatus to practice various aspects of the present disclosure in accordance with various embodiments.

FIG. 9 illustrates an example least one computer-readable storage medium 902 having instructions configured to practice all or selected ones of the operations associated with the techniques earlier described, in accordance with various embodiments. As illustrated, least one non-transitory computer-readable storage medium 902 may include a number of programming instructions 1004. Programming instructions 1004 may be configured to enable a device, e.g., computer 900, in response to execution of the programming instructions, to perform, e.g., various operations of processes of FIGS. 4-8, e.g., but not limited to, to the various operations performed to perform dynamic audio configuration techniques described herein. In alternate embodiments, programming instructions 1004 may be disposed on multiple least one non-transitory computer-readable storage media 1002 instead. In still other embodiment, programming instructions 904 may be disposed on transitory computer-readable storage medium, such as signal, instead.

Referring back to FIG. 8, for one embodiment, at least one of processors 802 may be packaged together with computational logic 822 configured to practice aspects of processes of FIGS. 4-7. For one embodiment, at least one of processors 802 may be packaged together with computational logic 822 configured to practice aspects of processes of FIGS. 4-7 to form a System in Package (SiP). For one embodiment, at least one of processors 802 may be integrated on the same die with computational logic 822 configured to practice aspects of processes of FIGS. 4-7. For one embodiment, at least one of processors 802 may be packaged together with computational logic 822 configured to practice aspects of processes of FIGS. 4-7 to form a System on Chip (SoC). For at least one embodiment, the SoC may be utilized in, e.g., but not limited to, a computing tablet. (e.g., Wi-Fi, Blue Tooth, Blue Tooth Low Energy, Near Field Communications, Radio-frequency identification (RFID), etc.) and other components as necessary to meet functional and non-functional requirements of the system.

Computer-readable media (including at least one computer-readable media), methods, apparatuses, systems and devices for performing the above-described techniques are illustrative examples of embodiments disclosed herein.

Additionally, other devices in the above-described interactions may be configured to perform various disclosed techniques. Particular examples of embodiments, described herein include, but are not limited to, the following:

Example 1 may include an apparatus for computing. The apparatus may include one or more computer processors and a wireless communicator, coupled to the one or more computer processors, to send and receive wireless communications from a plurality of computing devices. The apparatus may also include a device location determiner to operate on the one or more computer processors to determine location information for the plurality of computing devices based at least in part on the wireless communications received. The apparatus may also include a device location presenter to operate on the one or more computing processors to present visual elements representing the plurality of computing devices that are within a proximity threshold to the apparatus or to selected one or ones of the plurality of computing devices for selection for connection, based at least in part on determined location information of the plurality of computing devices.

Example 2 may include the apparatus of example 1, wherein the device location determiner may be to determine location information through determination of proximity information based at least in part on wireless communication signal information for wireless communications with the one or more computing devices.

Example 3 may include the apparatus of example 2, wherein the device location determiner may be to determine proximity information based at least in part on wireless communication signal strength.

Example 4 may include the apparatus of any of examples 1-3, wherein the device location determiner may be to determine location information for a first computing device out of the plurality of computing devices further based on known location information for a second computing device out of the one or more computing devices.

Example 5 may include the apparatus of example 4, wherein the device location determiner may be to receive relative location information for the first computing device, the relative location information describing a location for the first computing device relative to the second computing device.

Example 6 may include the apparatus of example 5, wherein the device location determiner may be to request the relative location information for the first computing device from the second computing device.

Example 7 may include the apparatus of example 6, wherein the device location determiner may be to receive an indication from a user for the device location determiner to request relative location information of the first computing device from the second computing device.

Example 8 may include the apparatus of example 5, wherein the device location presenter may be to present a first visual element representing the first computing device, based on the relative location information for the first computing device.

Example 9 may include the apparatus of any of examples 1-8, wherein the device location presenter may be to present the visual elements for the plurality of computing devices in association with determined location information for the one or more computing devices to facilitate interaction between the apparatus and the one or more computing devices Example 10 may include the apparatus of any of examples 1-9, wherein the device location presenter may be to present the visual elements in a list that may be sorted by proximity to the apparatus.

Example 11 may include the apparatus of example 10, wherein the device location presenter may be to present the visual elements in the list such that the visual elements are spaced apart based on their proximity to the apparatus.

Example 12 may include the apparatus of any of examples 1-11, wherein the device location presenter may be to present the visual elements on a two-dimensional layout according to their locations relative to the apparatus.

Example 13 may include the apparatus of any of examples 1-12, wherein the device location presenter may be to present the visual elements to vary in size according to the proximity to the apparatus.

Example 14 may include the apparatus of any of examples 1-13, and may further include a device filter to operate on the one or more computing processors to filter the plurality of computing devices out of a larger set of multiple available computing devices.

Example 15 may include the apparatus of example 14, wherein the device filter may be to further filter the plurality of computing devices based on device type.

Example 16 may include the apparatus of example 14, wherein the device filter may be to further filter the plurality of computing devices based on device name.

Example 17 may include the apparatus of any of examples 1-16, and may further include a device connector to receive a selection of a computing device for which a visual element was presented by the device location presenter and connect to a selected computing device of the plurality of computing devices to the apparatus or another computing device.

Example 18 may include one or more non-transitory computing-readable media containing instructions written thereon. The instructions, in response to execution on a computing system, may cause the computing system to determine location information for a plurality of computing devices based at least in part on wireless communications sent and received between the computing system and a plurality of computing devices. The instructions may also cause the computing system to present visual elements representing the plurality of computing devices that are within a proximity threshold to the computing system or to selected one or ones of the plurality of computing devices for selection for connection, based at least in part on determined location information of the plurality of computing devices.

Example 19 may include the one or more non-transitory computing-readable media of example 18, wherein determine location information may include determine proximity information based at least in part on wireless communication signal information for wireless communications with the one or more computing devices.

Example 20 may include the one or more non-transitory computing-readable media of example 19, wherein determine proximity information may include determine proximity information based at least in part on wireless communication signal strength.

Example 21 may include the one or more non-transitory computing-readable media of any of examples 18-20, wherein determine location information may include determine location information for a first computing device out of the plurality of computing devices further based on known location information for a second computing device out of the one or more computing devices.

Example 22 may include the one or more non-transitory computing-readable media of example 21, wherein the instructions may further be to cause the computing system to receive relative location information for the first computing device, the relative location information describing a location for the first computing device relative to the second computing device.

Example 23 may include the one or more non-transitory computing-readable media of example 22, wherein request relative location information for the first computing device may include request location information from the second computing device.

Example 24 may include the one or more non-transitory computing-readable media of example 23, wherein the instructions may further be to cause the computing system to receive an indication from a user to request relative location information of the first computing device from the second computing device.

Example 25 may include the one or more non-transitory computing-readable media of example 22, wherein present visual elements may include present a first visual element representing the first computing device, based on the relative location information for the first computing device.

Example 26 may include the one or more non-transitory computing-readable media of any of examples 18-25, wherein present visual elements may include present visual elements for the plurality of computing devices in association with determined location information for the one or more computing devices to facilitate interaction between the apparatus and the one or more computing devices Example 27 may include the one or more non-transitory computing-readable media of any of examples 18-26, wherein present the visual elements may include present the visual element in a list that may be sorted by proximity to the apparatus.

Example 28 may include the one or more non-transitory computing-readable media of example 27, wherein present the visual elements in the list may include present the visual elements such that the visual elements are spaced apart based on their proximity to the apparatus.

Example 29 may include the one or more non-transitory computing-readable media of any of examples 18-28, wherein present the visual elements may include present the visual elements on a two-dimensional layout according to their locations relative to the apparatus.

Example 30 may include the one or more non-transitory computing-readable media of any of examples 18-29, wherein present the visual elements may include present the visual elements to vary in size according to the proximity to the apparatus.

Example 31 may include the one or more non-transitory computing-readable media of any of examples 18-30, wherein the instructions are further to cause the computing system to filter the plurality of computing devices out of a larger set of multiple available computing devices.

Example 32 may include the one or more non-transitory computing-readable media of example 31, wherein filter the plurality of computing devices may include filter the plurality of computing devices based on device type.

Example 33 may include the one or more non-transitory computing-readable media of example 31, wherein filter the plurality of computing devices may include filter the plurality of computing devices based on device name.

Example 34 may include the one or more non-transitory computing-readable media of any of examples 18-33, wherein the instructions may further be to cause the computing system to receive a selection of a computing device for which a visual element was presented by the device location presenter and connect to a selected computing device of the plurality of computing devices to the apparatus or another computing device.

Example 35 may include a method for computing. The method may include determining, by a computing system, location information for a plurality of computing devices based at least in part on wireless communications sent and received between the computing system and a plurality of computing devices. The method may also include presenting, by the computing system, visual elements representing the plurality of computing devices that are within a proximity threshold to the computing system or to selected one or ones of the plurality of computing devices for selection for connection, based at least in part on determined location information of the plurality of computing devices.

Example 36 may include the method of example 35, wherein determining location information may include determining proximity information based at least in part on wireless communication signal information for wireless communications with the one or more computing devices.

Example 37 may include the method of example 36, wherein determining proximity information may include determining proximity information based at least in part on wireless communication signal strength.

Example 38 may include the method of any of examples 35-37, wherein determining location information may include determining location information for a first computing device out of the plurality of computing devices further based on known location information for a second computing device out of the one or more computing devices.

Example 39 may include the method of example 38, and may further include receiving, by the computing system, relative location information for the first computing device, the relative location information describing a location for the first computing device relative to the second computing device.

Example 40 may include the method of example 39, wherein requesting relative location information for the first computing device may include requesting location information from the second computing device.

Example 41 may include the method of example 40, and may further include receiving, by the computing system, an indication from a user to request relative location information of the first computing device from the second computing device.

Example 42 may include the method of example 39, wherein presenting visual elements may include presenting a first visual element representing the first computing device, based on the relative location information for the first computing device.

Example 43 may include the method of any of examples 35-42, wherein presenting visual elements may include presenting visual elements for the plurality of computing devices in association with determined location information for the one or more computing devices to facilitate interaction between the apparatus and the one or more computing devices Example 44 may include the method of any of examples 35-43, wherein presenting the visual elements may include presenting the visual element in a list that may be sorted by proximity to the apparatus.

Example 45 may include the method of example 44, wherein presenting the visual elements in the list may include presenting the visual elements such that the visual elements are spaced apart based on their proximity to the apparatus.

Example 46 may include the method of any of examples 35-45, wherein presenting the visual elements may include presenting the visual elements on a two-dimensional layout according to their locations relative to the apparatus.

Example 47 may include the method of any of examples 35-46, wherein presenting the visual elements may include presenting the visual elements to vary in size according to the proximity to the apparatus.

Example 48 may include the method of any of examples 35-47, and may further include filtering, by the computing system, the plurality of computing devices out of a larger set of multiple available computing devices.

Example 49 may include the method of example 48, wherein filtering the plurality of computing devices may include filtering the plurality of computing devices based on device type.

Example 50 may include the method of example 48, wherein filtering the plurality of computing devices may include filtering the plurality of computing devices based on device name.

Example 51 may include the method of any of examples 35-50, and may further include receiving, by the computing system, a selection of a computing device for which a visual element was presented by the device location presenter and connecting, by the computing system, to a selected computing device of the plurality of computing devices to the apparatus or another computing device.

Example 52 may include an apparatus for computing. The apparatus may include means for sending and receiving wireless communications from a plurality of computing devices. The apparatus may also include means for determining location information for the plurality of computing devices based at least in part on the wireless communications. The apparatus may also include means for presenting visual elements representing the plurality of computing devices that are within a proximity threshold to the apparatus or to selected one or ones of the plurality of computing devices for selection for connection, based at least in part on determined location information of the plurality of computing devices.

Example 53 may include the apparatus of example 52, wherein means for determining location information may include means for determining proximity information based at least in part on wireless communication signal information for wireless communications with the one or more computing devices.

Example 54 may include the apparatus of example 53, wherein means for determining proximity information may include means for determining proximity information based at least in part on wireless communication signal strength.

Example 55 may include the apparatus of any of examples 52-54, wherein means for determining location information may include means for determining location information for a first computing device out of the plurality of computing devices further based on known location information for a second computing device out of the one or more computing devices.

Example 56 may include the apparatus of example 55, and may further include means for receiving relative location information for the first computing device, the relative location information describing a location for the first computing device relative to the second computing device.

Example 57 may include the apparatus of example 56, wherein means for requesting relative location information for the first computing device may include means for requesting location information from the second computing device.

Example 58 may include the apparatus of example 57, and may further include means for receiving an indication from a user to request relative location information of the first computing device from the second computing device.

Example 59 may include the apparatus of example 56, wherein means for presenting visual elements may include means for presenting a first visual element representing the first computing device, based on the relative location information for the first computing device.

Example 60 may include the apparatus of any of examples 52-59, wherein means for presenting visual elements may include means for presenting visual elements for the plurality of computing devices in association with determined location information for the one or more computing devices to facilitate interaction between the apparatus and the one or more computing devices Example 61 may include the apparatus of any of examples 52-60, wherein means for presenting the visual elements may include means for presenting the visual element in a list that may be sorted by proximity to the apparatus.

Example 62 may include the apparatus of example 61, wherein means for presenting the visual elements in the list may include means for presenting the visual elements such that the visual elements are spaced apart based on their proximity to the apparatus.

Example 63 may include the apparatus of any of examples 52-62, wherein means for presenting the visual elements may include means for presenting the visual elements on a two-dimensional layout according to their locations relative to the apparatus.

Example 64 may include the apparatus of any of examples 52-63, wherein means for presenting the visual elements may include means for presenting the visual elements to vary in size according to the proximity to the apparatus.

Example 65 may include the apparatus of any of examples 52-64 and may further include means for filtering the plurality of computing devices out of a larger set of multiple available computing devices.

Example 66 may include the apparatus of example 65, wherein means for filtering the plurality of computing devices may include means for filtering the plurality of computing devices based on device type.

Example 67 may include the apparatus of example 65, wherein means for filtering the plurality of computing devices may include means for filtering the plurality of computing devices based on device name.

Example 68 may include the apparatus of any of examples 52-67, and may further include means for receiving a selection of a computing device for which a visual element was presented by the device location presenter and means for connecting to a selected computing device of the plurality of computing devices to the apparatus or another computing device.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus, comprising:
one or more computer processors;
a wireless communicator, coupled to the one or more computer processors, to wirelessly send communications to, and wirelessly receive communications from, a set of multiple available computing devices;
a device location determiner to operate on the one or more computer processors to determine location information for the set of multiple available computing devices based at least in part on the wireless communications received, the location information including location information about other computing devices reachable by the set of multiple available computing devices;
a device filter to operate on the one or more computer processors to obtain a plurality of computing devices from the set of multiple available computing devices and other computing devices, by filtering out computing devices on the basis of a proximity threshold from either the apparatus or a computing device selected from the multiple available computing devices; and
a device location presenter to operate on the one or more computer processors to present visual elements representing the obtained plurality of computing devices, based at least in part on determined location information of the plurality of computing devices.

2. The apparatus of claim 1, wherein the device location determiner is to determine location information through determination of proximity information based at least in part on wireless communication signal information for wireless communications with the multiple available computing devices.

3. The apparatus of claim 2, wherein the device location determiner is to determine proximity information based at least in part on wireless communication signal strength.

4. The apparatus of claim 1, wherein the device location determiner is to determine location information for a first computing device out of the plurality of computing devices further based on known location information for a second computing device out of the multiple available computing devices.

5. The apparatus of claim 4, wherein the device location determiner is to receive relative location information for the first computing device, the relative location information describing a location for the first computing device relative to the second computing device.

6. The apparatus of claim 5, wherein the device location determiner is to request the relative location information for the first computing device from the second computing device.

7. The apparatus of claim 6, wherein the device location determiner is to receive an indication from a user for the device location determiner to request relative location information of the first computing device from the second computing device.

8. The apparatus of claim 5, wherein the device location presenter is to present a first visual element representing the first computing device, based on the relative location information for the first computing device.

9. The apparatus of claim 1, wherein the device location presenter is to present the visual elements for the plurality of computing devices in association with determined location information for the multiple available computing devices to facilitate interaction between the apparatus and the multiple available computing devices.

10. The apparatus of claim 1, wherein the device location presenter is to present the visual elements in a list that is sorted by proximity to the apparatus.

11. The apparatus of claim 10, wherein the device location presenter is to present the visual elements in the list such that the visual elements are spaced apart based on their proximity to the apparatus.

12. The apparatus of claim 1, wherein the device location presenter is to present the visual elements on a two-dimensional layout according to their locations relative to the apparatus.

13. The apparatus of claim 1, wherein the device location presenter is to present the visual elements to vary in size according to their proximity to the apparatus.

14. The apparatus of claim 1, wherein the device filter is to further obtain the plurality of computing devices based on device type or device name.

15. The apparatus of claim 1, further comprising a device connector to:
receive a selection of a computing device for which a visual element was presented by the device location presenter; and
connect a selected computing device of the plurality of computing devices to the apparatus or another computing device.

16. One or more non-transitory computer-readable media containing instructions written thereon that, in response to execution on a computing system, cause the computing system to:
determine location information for a set of multiple available computing devices based at least in part on communications wirelessly sent and wirelessly received between the computing system and the set of multiple available computing devices, the location information including location information about other computing devices reachable by the set of multiple available computing devices;
obtain a plurality of computing devices from the set of multiple available computing devices and other computing devices, by filtering out computing devices on the basis of a proximity threshold from either the computing system or a computing device selected from the multiple available computing devices; and
present visual elements representing the obtained plurality of computing devices, based at least in part on determined location information of the plurality of computing devices.

17. The one or more non-transitory computing-readable media of claim 16, wherein determine location information comprises determine proximity information based at least in part on wireless communication signal information for wireless communications with the multiple available computing devices.

18. The one or more non-transitory computing-readable media of claim 16, wherein determine location information comprises determine location information for a first computing device out of the plurality of computing devices further based on known location information for a second computing device out of the multiple available computing devices.

19. The one or more non-transitory computing-readable media of claim 16, wherein the instructions are further to cause the computing system to:
receive a selection of a computing device for which a visual element was presented by a device location presenter; and connect a selected computing device of the plurality of computing devices to an apparatus or another computing device.

20. A method, comprising:

determining, by a computing system, location information for a set of multiple available computing devices based at least in part on communications wirelessly sent to and wirelessly received from the computing system and the set of multiple available computing devices, the location information including location information about other computing devices reachable by each computing device in the set of multiple available computing devices;

obtaining, by a computing system, a plurality of computing devices from the set of multiple available computing devices and other computing devices, by filtering out computing devices on the basis of a proximity threshold from either the computing system or a computing device selected from the multiple available computing devices; and presenting, by the computing system, visual elements representing the obtained plurality of computing devices, based at least in part on determined location information of the plurality of computing devices.

21. The method of claim 20, wherein determining location information comprises determining proximity information based at least in part on wireless communication signal information for wireless communications with the multiple available computing devices.

22. The method of claim 20, wherein determining location information comprises determining location information for a first computing device out of the plurality of computing devices further based on known location information for a second computing device out of the multiple available computing devices.

* * * * *